June 4, 1968  A. C. MAST ET AL  3,386,587

TUBULAR FILTER ELEMENT END CAPS

Filed Oct. 22, 1965

INVENTORS
ANDREW C. MAST
OTTO R. HAVELKA
BY *Featherstonhaugh & Co.*
ATTORNEYS 3,386,587
TUBULAR FILTER ELEMENT END CAPS
Andrew C. Mast, Brampton, Ontario, and Otto R. Havelka, Weston, Ontario, Canada, assignors to Aircraft Appliances and Equipment Limited, Rexdale, Ontario, Canada
Filed Oct. 22, 1965, Ser. No. 502,178
1 Claim. (Cl. 210—493)

ABSTRACT OF THE DISCLOSURE

A tubular filter element formed with a rim at at least one end, and having a head with a neck formed with an external rim engaging surface adapted to fit within the rim, and having a collar with an internal rim engaging surface adapted to fit around the external surface of the rim, the surfaces being of complementary conical shape and movable relative to one another to deform the rim therebetween forming a generally hollow truncated cone, the head, rim and collar being firmly clamped together and then sealed by welding.

---

This invention relates to tubular filter elements.

In particular this invention relates to a tubular filter element having a head and collar secured to the rim thereof to accurately locate the filter element in an operative position.

It is well known to employ hollow filter elements which are generally tubular in shape and which filter a fluid by the passage of the fluid from the hollow interior of the element through the filter element to the exterior thereof or vice versa. Filter elements of this type are commonly provided with a head which seals the rim of the filter element and serves to accurately locate the filter element within a filter housing.

Where the filter element is in the form of a metallic screen or sintered element, it is desirable to weld or braze the head to the rim of the element and the design of heads presently used are such that the various operations required to accurately and rigidly secure the head to the rim prior to welding or brazing are costly and time consuming.

In one known process wherein a head is rigidly secured to a filter element it is necessary to coat the filter element with wax and to freeze the coated element and grind the ends thereof to the required overall length. The wax coating and freezing operations are required in order to prevent grinding grit blocking the pores of the filter element during the grinding operation. After the element has been ground to the required length, then the wax must be removed and the filter element cleaned. The rims of the filter are then coated with a flux and brazed to the head. Where it is desirable to prevent corrosion, silver is used in the brazing operation and consequently the cost of this operation is very high. After the brazing operation the flux must be removed from the filter element and an electro polishing process is used to clean the filter element. It will be seen that even where a head having a relatively simple construction is used the various preparation steps required are such that this is a costly and time consuming operation.

It is an object of this invention to provide in a filter a filter element having a head and collar assembly which is inexpensive to manufacture and can be readily and accurately secured to the tubular filter element.

It is a further object of this invention to provide in a filter a filter element having a head formed with an aperture therethrough to communicate with the interior of the filter element.

It is a still further object of this invention to provide a filter element having a head which is in the form of an end closure member adapted to prevent the passage of fluid into or from a hollow filter body.

Again it is an object of this invention to provide a filter element as previously described wherein a groove is formed on the outer surface of the head to facilitate welding of the head in place.

It is a still further object of this invention to provide a filter element which includes a collar adapted to fit over the rim of the tubular filter element and a head adapted to fit within the rim of the tubular filter element to clamp the rim edge therebetween.

It is a still further object of this invention to provide in a filter a filter element including a collar and head as previously described wherein said head and collar are formed with rim engaging surfaces which grip the rim edge of the filter element therebetween in the form of a truncated cone having a centerline coincident with the centerline of the filter element.

It is a further object of this invention to provide a hollow tubular filter element having a head and collar assembly as previously described at each end thereof.

It is also an object of this invention to provide a simple and inexpensive head and collar assembly which may be welded to the rim of a filter element.

It is another object of this invention to provide a simple and inexpensive method of locating the rim of a filter element in abutting relation to the rim engaging surfaces of a head and complementary collar.

With these and other objects in view the invention relates to an improved tubular filter element having a rim at at least a first end thereof. The improvement of the present invention includes the provision of a head having a neck which is adapted to fit within the rim of the filter element and is provided with an external rim engaging surface and a collar extending around said neck and having an internal rim engaging surface in spaced relation to said external rim engaging surface of said neck and defining therewith an annular space. The rim of the tubular filter being in said annular space in abutting relation to the rim engaging surfaces and rigidly gripped thereby. The rim engaging surfaces is inclined relative to the longitudinal axis of the filter element to dispose the rim of the element at an incline in the form of a hollow truncated cone. The rim, collar and neck are then welded together to rigidly secure the head in the required position.

This invention also relates to a method of securing a head and collar to a rim of a hollow tubular filter element comprising the steps of locating the collar in a position surrounding the rim and locating a head in a position to enter said rim and moving the head relative to the collar to grip the rim edge therebetween and welding together the rim, head and collar to seal the rim and rigidly secure the end assembly.

The invention will be more clearly understood after reference to the following detailed specification read in conjunction with the drawings wherein.

Figure 1:
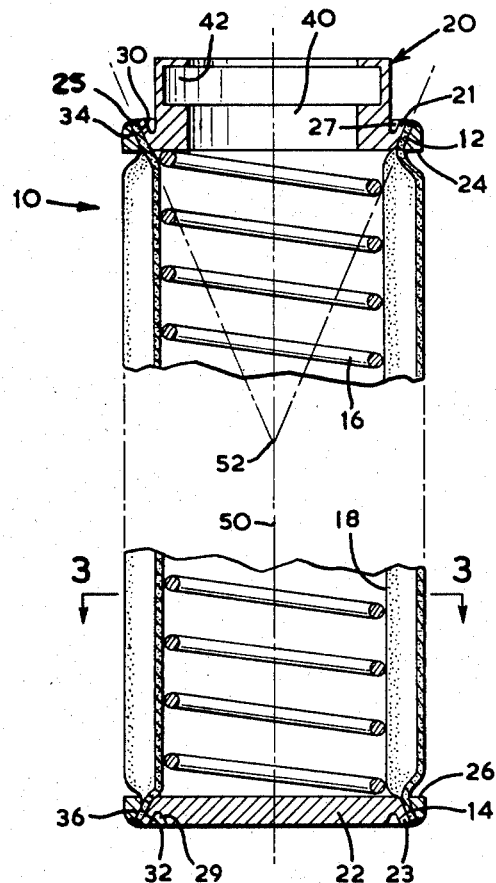
FIGURE 1 is a sectional view of a filter element assembly.

With reference to the drawings, the reference numeral 10 refers to a tubular filter element having a rim 12 at one end thereof and a rim 14 at the other end thereof. In the embodiment illustrated in the drawings, the filter element is made from a stainless steel screen which has been sintered and pleated and is provided with a reinforcing coil spring 16 adapted to fit within the bore 18 such that the filter may be used to filter fluid passing into the bore 18. The rims 12 and 14 are formed by flattening out the pleats in a simple rolling operation. The filter element may be supported by a mandrel and rotated with the mandrel and rollers applied to the external surface of the filter element to flatten the pleats. It will be apparent however that the application of the present invention is not restricted to use with pleated filter elements and it may equally well be applied to non-pleated filter elements.

In the embodiment of the invention as illustrated in the drawings, a head 20 having a neck portion 21 is adapted to be fitted at one end of the filter element and a head 22 having a neck portion 23 is adapted to be fitted at the other end thereof. The head 20 is formed with a passage 40 extending therethrough and communicating with the bore 18 of the filter element such that fluid passing through the filter element into the bore 18 may pass out of the filter element assembly by way of the passage 40. An undercut 42 is formed in the head 20 to locate a suitable sealing means such as an O-ring. The head 22 is in the form of an end closure member which prevents the passage of fluid out of the filter element.

The necks 21 and 23 are formed with rim engaging surfaces 30 and 32 respectively which are adapted to be located within the rims 12 and 14 of the filter element.

A collar 24 is adapted to extend around the neck 21 and a collar 26 is adapted to extend around the neck 23 to cooperate with the head members 20 and 22 respectively. The collar 24 is formed with an internal rim engaging surface 34 and the collar 26 is formed with an internal rim engaging surface 36. The internal rim engaging surfaces of the collars are adapted to be located in a spaced relation to the external rim engaging surfaces of the neck to define an annular space therebetween within which the rims of the filter element are located.

Having regard to FIGURE 1, it will be seen that the tubular element 10 is formed about an axis 50 and in the preferred embodiment the rim portions 12 and 14 are bent outwardly by the rim engaging surfaces of the necks and collars. In the drawings it will be seen that the rim portions 12 and 14 define a hollow truncated cone having a centreline coincident with the axis of the filter element and wherein the apex 52 of the truncated cone is located inwardly of the free edge of the filter element.

Figure 2:
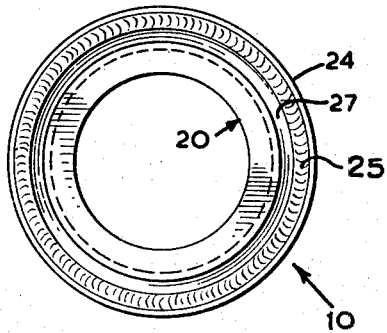
FIGURE 2 is a plan view of the filter element assembly of FIGURE 1.
Figure 3:
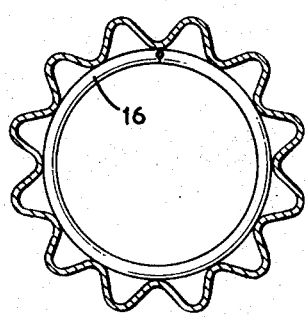
FIGURE 3 is a view of a section in the direction of arrows 3—3 of FIGURE 1.

The heads 20 and 22 are formed with circumferentially extending grooves 27 and 29 which are located adjacent and spaced inwardly from the rim engaging surfaces of the necks to form circumferentially extending lips. The grooves reduce the rate of heat transfer during the welding operation and permit an even welding of the adjacent areas of the neck and collar as shown at 25 in FIGURE 2.

To assemble the head unit in position the collar 26 is first located in position surrounding the rim 12, it will be understood that at this time the rim 12 is not inclined as shown in FIGURE 1. The neck portion 21 of the head 20 is then forced into the bore and the neck and collar are pressed together to grip the rim 12 between the rim engaging surfaces 34 and 30. By careful dimensioning of the head and neck members they will cooperate with one another to line up in the area of the weld 25. The weld 25 joins together the neck, rim and head to form a sealed end assembly and as previously stated the circumferentially extending grooves 27 and 29 permit an even weld to be formed.

From the aforegoing it will be apparent that the present invention provides a tubular filter element assembly in which all the components are properly aligned and which will fit accurately into a filter housing without any machining operations after welding.

We claim:

1. In a tubular filter element having a longitudinal axis and a substantially flat cylindrical rim at at least a first end thereof; the improvement comprising: a head having a neck, said neck having an external rim engaging surface, a collar extending around said neck having an internal rim engaging surface in spaced relation to said external rim engaging surface of said neck and defining therewith an annular space, said rim being located in said annular space, said neck and collar being axially movable toward one another to reduce the width of the annular space formed therebetween to rigidly grip said rim between said rim engaging surfaces and to deform said rim to the contour of said rim engaging surfaces, said head, rim and neck being held together by said gripping action and sealed by welding, said rim engaging surfaces being inclined relative to said longitudinal axis to dispose said rim of said element at an incline relative to said longitudinal axis of said filter element in the form of a hollow truncated cone generated from an apex which lies in a direction towards said filter element and is coincident with said axis of said filter element.

References Cited

UNITED STATES PATENTS 3,007,238 11/1961 Pall _____ 29—163.5
3,007,579 11/1961 Pall _____ 210—493

FOREIGN PATENTS 970,409 9/1964 Great Britain.

REUBEN FRIEDMAN, *Primary Examiner.*

F. SPEAR, *Assistant Examiner.*